3,023,302
ELECTRIC ARC WELDING
Harry E. Kennedy, Berkeley, Calif., and Gerard E. Claussen, Summit, N.J., assignors to Union Carbide Corporation, a corporation of New York
Filed Apr. 3, 1957, Ser. No. 650,383
13 Claims. (Cl. 219—74)

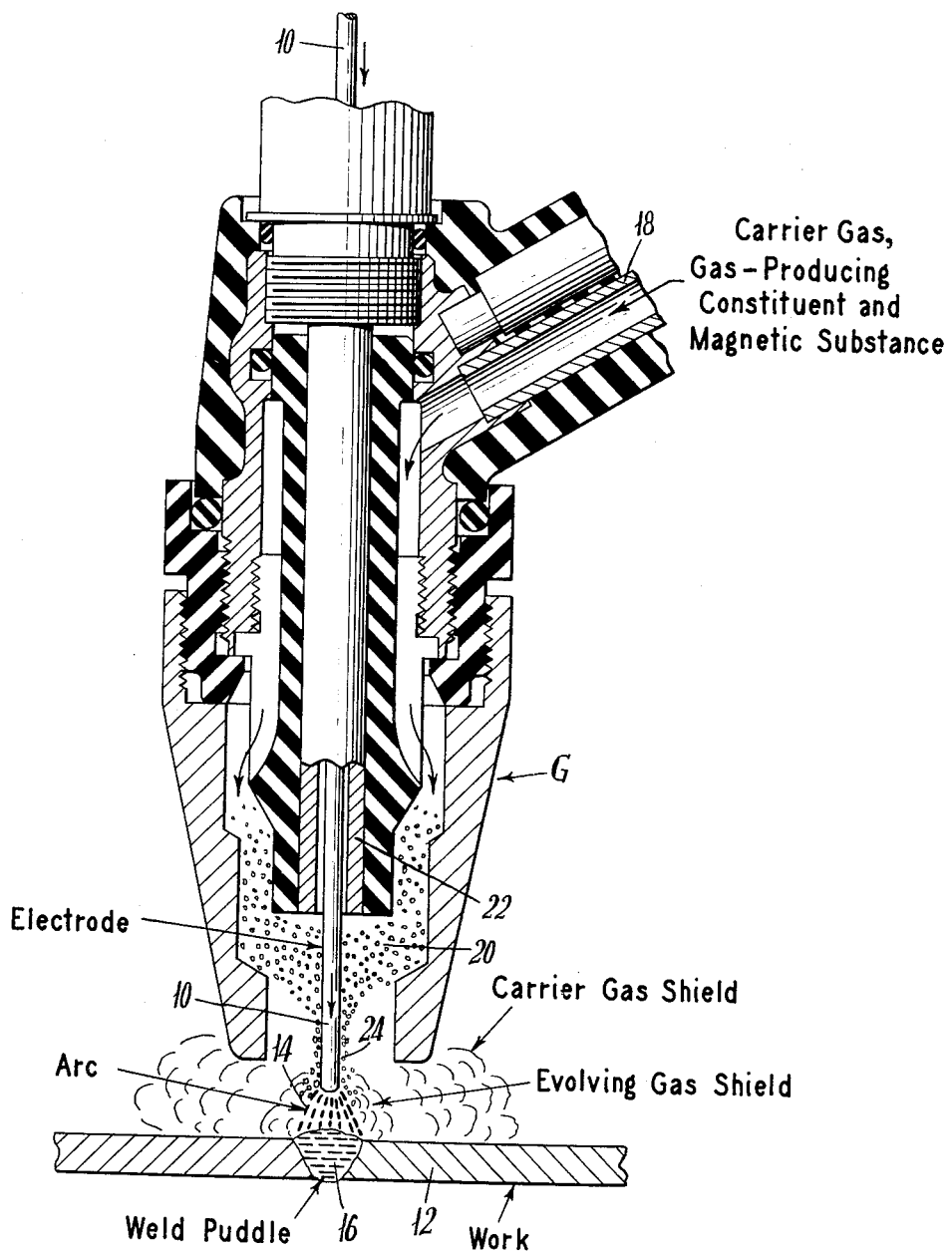

This invention relates to shielded electric metal arc welding as disclosed by the application of Harry E. Kennedy, Serial No. 481,906, filed January 14, 1955, now abandoned, and more particularly to such welding with a magnetic welding composition that evolves gas.

Gas-evolving fluxes may be defined broadly as those which, upon decomposition in the vicinity of the arc and weld puddle, evolve $CO_2$ and/or $H_2O$. Such gases are preferably inert with respect to the molten weld puddle, and it is important that a sufficient quantity of gas be evolved to displace the air from the vicinity of the arc and thus serve as a gaseous shielding medium.

The present invention involves the utilization of fluxes of this type in arc welding wherein the gas-producing constituent and a magnetic substance are carefully mixed with other constituents to form a flux having magnetic permeability, and fed to the electrode by a suitable carrier gas, such as $CO_2$ or even air, and there magnetically attracted to the electrode and thus conveyed to the arc. As little evolution as 2% $CO_2$ or 0.5% $H_2O$ produces important results.

The general range of constituents in a suitable welding composition according to the invention which evolves gas ($CO_2$) is as follows:

| | Percent |
|---|---|
| Gas-evolving constituent ($CaCO_3$, dolomite, $MgCO_3$, $BaCO_3$, asbestos, mica) | 12–40 |
| Fluoride (cryolite or $CaF_2$) | 5–30 |
| Rutile | Trace–25 |
| $Al_2O_3$ | Trace–10 |
| $SiO_2$ | Trace–10 |
| FeTi | 3–10 |
| FeSi | 3–10 |
| FeMn | 1–5 |
| Iron powder | 10–35 |
| Binder (sodium and/or potassium silicate) | 2–5 |

In the drawing:
The single FIGURE is a view in cross section of an electric arc welding torch in operation illustrating the invention.

As shown, a metal electrode 10 in the form of a wire is fed at a rapid rate (350 inches per minute in the case of 3/64 inch diameter wire) toward the work 12 to be welded, as an electric arc 14 is energized between the end of such electrode and the work, of sufficient intensity to fuse such electrode and transfer molten metal therefrom to the adjacent area of the work, forming a weld puddle 16 which solidifies when the arc is moved away. A suitable powdered flux-carrying gas such as air or $CO_2$ is fed to the torch through an inlet 18 and distributed in an annular stream 20 about the end portion of the electrode 10 as the latter emerges from a tubular electrical contactor-guide 22 in the torch. The powdered flux is attracted to the current-carrying wire against the force of gravity and forms a covering 24 thereon that is carried therewith to the arc.

Sound surface beads and welds having good appearance have been produced according to the invention. In one weld, the flux was delivered with air as the carrier gas. The weld was made with a manual gun G at 300 amperes, D.C.-R.P., at 28 volts, with a 3/32-inch wire electrode. The weld metal contained 0.13% C, 0.73% Mn, 0.93% Si, and 0.021% nitrogen. The ratio of slag-to-electrode was 0.3. Tensile specimens were machined from an 8-pass butt weld in 1/2-inch mild steel plates and, with no further heat-treatment, exhibited tensile strength of 90,000 p.s.i., a yield point of 76,300 p.s.i., 28% elongation, and 64.6% reduction of area. Face bend specimens were bent 180 degrees. The flux had the following composition:

| | Percent |
|---|---|
| $CaCO_3$ | 29.6 |
| Cryolite | 10.3 |
| Rutile | 24.7 |
| FeSi | 9.4 |
| FeMn | 2.2 |
| Iron powder | 20.2 |
| Sodium silicate | 3.6 |

In another instance, flux with $CO_2$ fed at 35 cubic feet per hour as the flux carrier gas, was used to produce surface beads according to the invention at 300 amperes, 28 volts, with a 3/32-inch electrode. The deposits were sound in every respect and had good appearance, even though the operation was performed in a relatively strong draft (5 m.p.h.). The composition of such flux is given below:

| | Percent |
|---|---|
| $CaCO_3$ | 29.8 |
| $Al_2O_3$ | 2.4 |
| $SiO_2$ | 5.4 |
| $CaF_2$ | 27.0 |
| FeTi | 6.8 |
| FeSi | 6.1 |
| FeMn | 0.7 |
| Iron powder | 19.6 |
| Sodium silicate | 1.1 |
| Potassium silicate | 1.1 |

What is claimed is:
1. Shielded electric metal arc welding process which comprises delivering a stream of gas-carried magnetic flux powder around the end portion of a metal wire electrode to which, after the arc is struck and while welding current is flowing in such wire electrode, such powder is attracted with sufficient magnetic force to dominate the force of gravity and form a flux covering on such a wire electrode, striking a welding arc between the end of such wire and the work to be welded, maintaining such welding arc and feeding the magnetic-powder-covered wire toward such an arc as the end is consumed thereby, characterized in that said magnetic flux powder contains 12–40% of a weld-protective gas-evolving constituent of the class consisting of $CaCO_3$, dolomite, $MgCO_3$, $BaCO_3$, asbestos and mica, which weld-protective gas serves to effectively shield such arc during the welding operation in case the flux carrier gas becomes ineffective for such purpose.

2. Process as defined by claim 1, in which the flux powder also contains 5–30% fluoride selected from the class consisting of cryolite and $CaF_2$.

3. Shielded electric metal arc welding process which comprises delivering a stream of gas-carried magnetic flux powder around the end portion of a metal wire electrode to which, after the arc is struck and while welding current is flowing in such wire electrode, such powder is attracted with sufficient magnetic force to dominate the force of gravity and form a flux covering on such wire electrode, striking a welding arc between the end of such wire and the work to be welded, maintaining such welding arc and feeding the magnetic-powder-covered wire toward such arc as the end is consumed thereby, characterized in that said magnetic flux powder is composed of 12–40% of a weld-protective gas-evolving constituent selected from the class consisting of $CaCO_3$, dolomite, $MgCO_3$, $BaCO_3$, asbestos, and mica, 5–30% of a fluoride selected from the class consisting of $CaF_2$ and cryolite, 10–35% of iron powder, 3–10% FeTi, 3–10% of FeSi, 1–5% FeMn, and the balance a binder selected from the class consisting of sodium and potassium silicate, which weld-protective gas serves to effectively shield such arc during the welding operation in case the flux carrier gas becomes ineffective for such purpose.

4. Process as defined by claim 3, in which the flux powder contains a trace up to 10% $Al_2O_3$.

5. Process as defined by claim 3, in which the flux powder also contains a trace to 10% $SiO_2$.

6. A magnetic powdered shielded electric metal arc welding flux composed of gas-evolving constituent 12–40%, fluoride (cryolite or $CaF_2$) 5–30%, rutile trace–25%, $Al_2O_3$ trace–10%, $SiO_2$ trace–10%, FeTi 3–10%, FeSi 3–10%, FeMn 1–5%, iron powder 10–35%, and binder 2–5%.

7. A magnetic powdered flux for shielded electric metal arc welding composed of $CaCO_3$ 29.6%, cryolite 10.3%, rutile 24.7%, FeSi 9.4%, FeMn 2.2%, Iron powder 20.2%, and sodium silicate 3.6%.

8. A magnetic powdered flux for shielded electric metal arc welding composed of $CaCO_3$ 29.8%, $Al_2O_3$ 2.4%, $SiO_2$ 5.4%, $CaF_2$ 27.0%, FeTi 6.8%, FeSi 6.1%, FeMn 0.7%, iron powder 19.6%, sodium silicate 1.1%, and potassium silicate 1.1%.

9. A gas-borne magnetic flux powder containing 12–40% of a gas-evolving constituent of the class consisting of $CaCO_3$, dolomite, $MgCO_3$, $BaCO_3$, asbestos and mica, the balance being 10–35% iron, 5–30% fluoride selected from the class consisting of cryolite and $CaF_2$, 7 to 25% of metals of the class consisting of ferrosilicon, ferromanganese and ferrotitanium, up to 25% rutile, up to 10% alumina.

10. A magnetic flux powder as defined by claim 9, which also contains 5–30% fluoride selected from the class consisting of cryolite and $CaF_2$.

11. A gas-borne magnetic flux powder composed of 12–40% of a gas-evolving constituent selected from the class consisting of $CaCO_3$, dolomite, $MgCO_3$, $BaCO_3$, asbestos, and mica, 5–30% of a fluoride selected from the class consisting of $CaF_2$ and cryolite, 10–35% of iron powder, 3–10% FeTi, 3–10% of FeSi, 1–5% FeMn, and the balance a binder selected from the class consisting of sodium and potassium silicate.

12. A gas-borne magnetic flux powder as defined by claim 11, which also contains a trace to 10% $Al_2O_3$.

13. A gas-borne magnetic flux powder as defined by claim 11, which also contains a trace to 10% $SiO_2$.

References Cited in the file of this patent

UNITED STATES PATENTS

| | | |
|---|---|---|
| 1,374,711 | Armor | Apr. 12, 1921 |
| 1,501,266 | Brace | July 15, 1924 |
| 1,589,017 | Lincoln | June 15, 1926 |
| 1,745,267 | Pennington | Jan. 28, 1930 |
| 2,053,956 | Humberstone et al. | Sept. 8, 1936 |
| 2,200,737 | Clapp | May 14, 1940 |
| 2,291,482 | McLott | July 28, 1942 |
| 2,408,620 | Friedlander | Oct. 1, 1946 |
| 2,544,711 | Mikhalapov | Mar. 13, 1951 |
| 2,727,125 | Muller | Dec. 13, 1955 |
| 2,737,150 | Gayley | Mar. 6, 1956 |
| 2,767,302 | Brashear | Oct. 16, 1956 |
| 2,803,740 | Hyink | Aug. 20, 1957 |
| 2,810,063 | Brashear | Oct. 15, 1957 |

FOREIGN PATENTS

| | | |
|---|---|---|
| 248,363 | Great Britain | Feb. 18, 1926 |
| 394,319 | Great Britain | June 9, 1933 |
| 546,961 | Great Britain | Aug. 7, 1942 |
| 608,270 | Great Britain | Sept. 13, 1948 |